J. DRZEWIECKI.
DIRIGIBLE LAMP FOR AUTOMOBILES.
APPLICATION FILED AUG. 9, 1911.
1,008,962.
Patented Nov. 14, 1911.
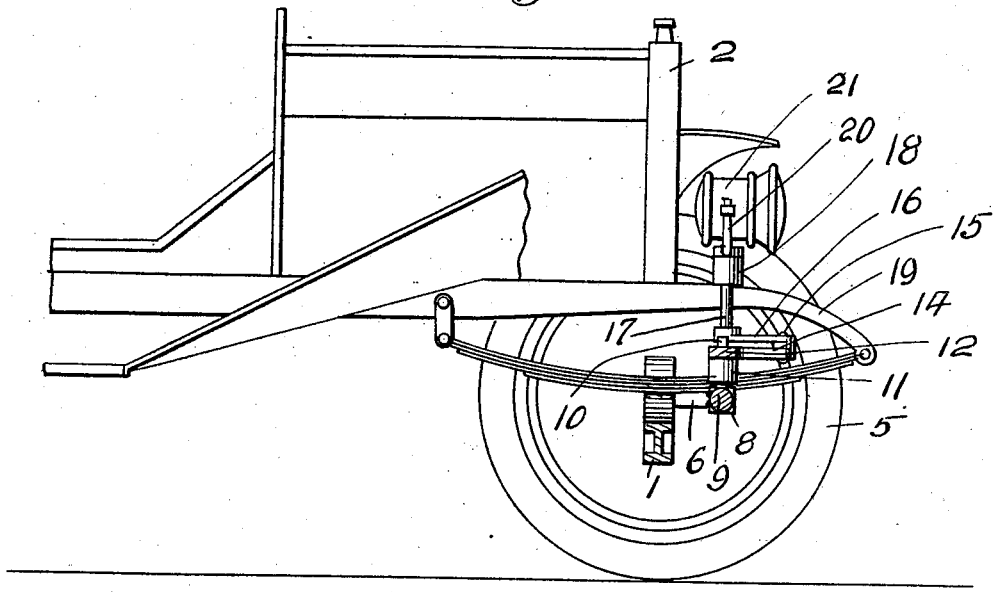
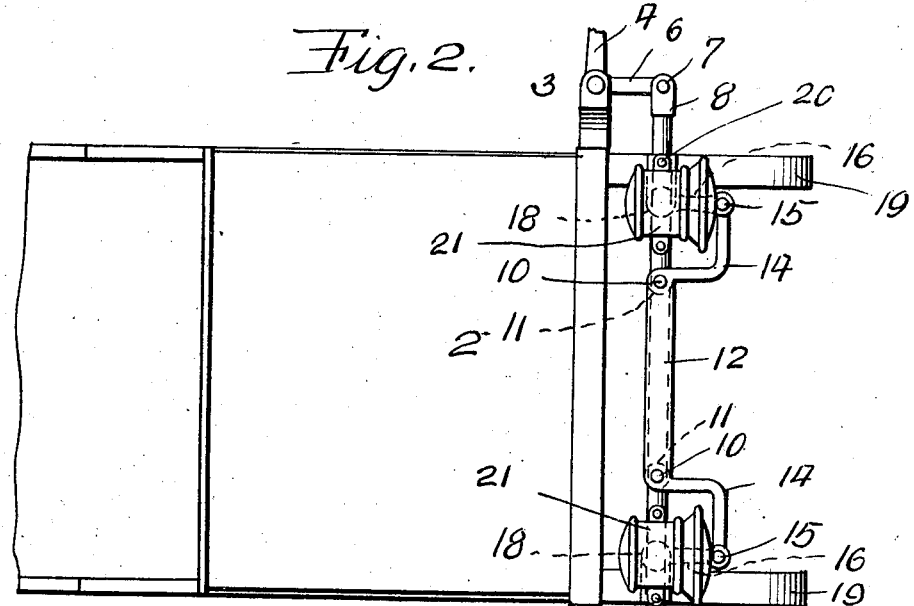
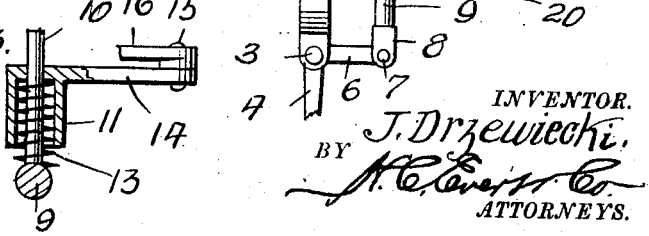

UNITED STATES PATENT OFFICE.

JOE DRZEWIECKI, OF DETROIT, MICHIGAN.

DIRIGIBLE LAMP FOR AUTOMOBILES.

1,008,962.  Specification of Letters Patent.  Patented Nov. 14, 1911.

Application filed August 9, 1911. Serial No. 643,175.

*To all whom it may concern:*

Be it known that I, JOE DRZEWIECKI, a subject of the Emperor of Russia, residing at Detroit, in the county of Wayne and State of Michigan, have invented certain new and useful Improvements in Dirigible Lamps for Automobiles, of which the following is a specification, reference being had therein to the accompanying drawing.

This invention relates to dirigible lamps for automobiles and similar vehicles.

My invention aims to provide a lamp shifting mechanism that can be operated in connection with the steering mechanism of the automobile, whereby the lamps or lanterns of the machine will be turned in the same direction as the wheels of the machine. The rays of light will then be cast in the path of the machine, particularly when the machine is rounding a curve or corner of intersecting streets. The lamp shifting mechanism is constructed to compensate for vibrations of the body of the machine, and the mechanism is of such construction that it is inexpensive to manufacture and highly efficient for the purposes for which it is intended.

The invention further aims to accomplish the above results by a combination of elements that will be hereinafter specifically described and then claimed.

Reference will now be had to the drawings, wherein:

Figure 1 is a longitudinal sectional view of a lamp shifting mechanism as applied to an automobile; Fig. 2 is a plan of the mechanism, and Fig. 3 is a large detailed sectional view of a portion of the mechanism.

The reference numeral 1 denotes the forward axle of an automobile 2, and this axle has knuckles 3 and spindles 4 adapted to support forward wheels 5. The knuckles 3 are provided with forwardly extending arms 6, and the forward ends of these arms are pivotally connected by pins 7 to the bifurcated ends 8 of a transverse rod 9. The rod 9, intermediate the ends thereof, is provided with a set of upwardly projecting pins 10, and movably mounted upon these pins are inverted cups 11 carried by a shifting bar 12. Encircling the pins 10 within the cups 11 are coiled compression springs, these springs resting upon the connecting rod 9. The shifting bar 12 has angle extensions 14 pivotally connected by pins 15 to a crank 16 of vertical shafts 17. The shafts 17 are journaled in vertical bearings 18, carried by the longitudinal frames 19 of the automobile. The upper ends of the shafts 17 have holders 20 for lamps or lanterns 21.

It is through the medium of the pins 10 and the springs 13 that the shifting bar 12 can adjust itself relatively to the connecting rod 9, and it is obvious that when the rod 9 is shifted that the bar 12 will be moved in a similar direction to swing the lamps or lanterns 21 in the same direction in which the wheels 5 are moved.

The lamp shifting mechanism is applicable to various types of automobiles, and with the mechanism made of strong and durable metal it will withstand the rough usage of vibrations to which it is subjected by the machine in operation.

What I claim is:

In a dirigible lamp for automobiles, the combination with the knuckles of the forward axle of the automobile, and vertical shafts supported by the automobile and provided with lamp holders, of arms carried by said knuckles, a connecting rod pivotally connected to said arms, upwardly extending pins carried by said connecting rod, a shifting bar, inverted cups carried by said bar and receiving said pins, compression springs encircling said pins within said cups, angle extensions carried by said shifting bar, and cranks carried by said shafts and pivotally connected to said extensions, whereby said lamps will be shifted simultaneously with said bar and said connecting rod.

In testimony whereof I affix my signature in the presence of two witnesses.

JOE DRZEWIECKI.

Witnesses:
  STENLY WITSKOWSKII,
  ZYGMUNT BYCSKOWSKY.